FREQUENCY CONVERSION SYSTEM UTILIZING MODULATION

Filed Aug. 5, 1966 2 Sheets-Sheet 1

INVENTOR
Edwin E. Maust, Jr.
Garrett R. Hyde

ATTORNEYS
Ernest S. Cohen

INVENTOR
Edwin E. Maust, Jr.
Garrett R. Hyde
ATTORNEYS
Ernest S. Cohen 3,369,168
FREQUENCY CONVERSION SYSTEM UTILIZING MODULATION Edwin E. Maust, Jr., Hyattsville, and Garrett R. Hyde, Greenbelt, Md., assignors to the United States of America as represented by the Secretary of the Interior Filed Aug. 5, 1966, Ser. No. 570,673
9 Claims. (Cl. 321—60)

ABSTRACT OF THE DISCLOSURE

Frequency conversion accomplished by an arrangement of synchronous transformers rotated by a motor drive to modulate the frequency of a standard frequency A-C carrier-current supplied thereto, wherefrom the modulate carrier is supplied to rectifier and filter circuitry separating this current into positive and negative components from which the carrier is filtered out. The remaining frequency components are combined by switch devices operatively driven in coordination with the transformers, to produce a sine wave output at the modulated frequency.

The invention relates to improvements in electrical current frequency converters, and more particularly, is concerned with changing electrical signals supplied at predetermined standard frequencies into large amplitude signals at other frequencies ranging from direct current to several kilocycles per second.

Current at low frequencies such as 20 cycles per second or less, is often needed for work done in shops and laboratories where only ordinary 60 cycle current is available. Devices heretofore used to take care of such needs, including electronic and beat frequency oscillators, normally have low power and voltage output. Moreover, such outputs are subject to distortion by temperature changes and component value changes. Precision crystal oscillators which require a small separation in resonance frequency to obtain relatively low frequencies are extremely temperature sensitive, and become costly to achieve proper stability for their operation. Motor driven sine potentiometers which may be used are adversely affected by wear over long periods, as well as by changes in ambient temperature, such that they are subject to noise, and generally have poor output quality at very low frequencies.

The present invention utilizes an arrangement of synchronous transformers in a system which supplies a stable sine wave output of at least 100 volts peak to peak over a wide range of frequencies including relatively very low frequencies. In the embodiment described herein, the synchronous transformers function to modulate a 60 cycle alternating current carrier with two low frequency sine waves 180 degrees out of phase. The positive and negative components of the modulated carrier are separated with rectifiers and the 60 cycles carrier is filtered out. The remaining positive and negative low frequency components are subsequently combined by the operation of coordinated switches to give a sine wave output.

It is therefore an object of the present invention to provide a reliable frequency converter making available stable voltages at selectable frequencies having relatively large amplitudes.

A further object of the present invention is to provide a sine wave generator for producing large amplitude, low frequency voltages having high stability.

These and other objects and advantages of the invention will be more clearly understood from the following description of a preferred embodiment of the invention considered together with the accompanying drawing wherein.

Figure 1:
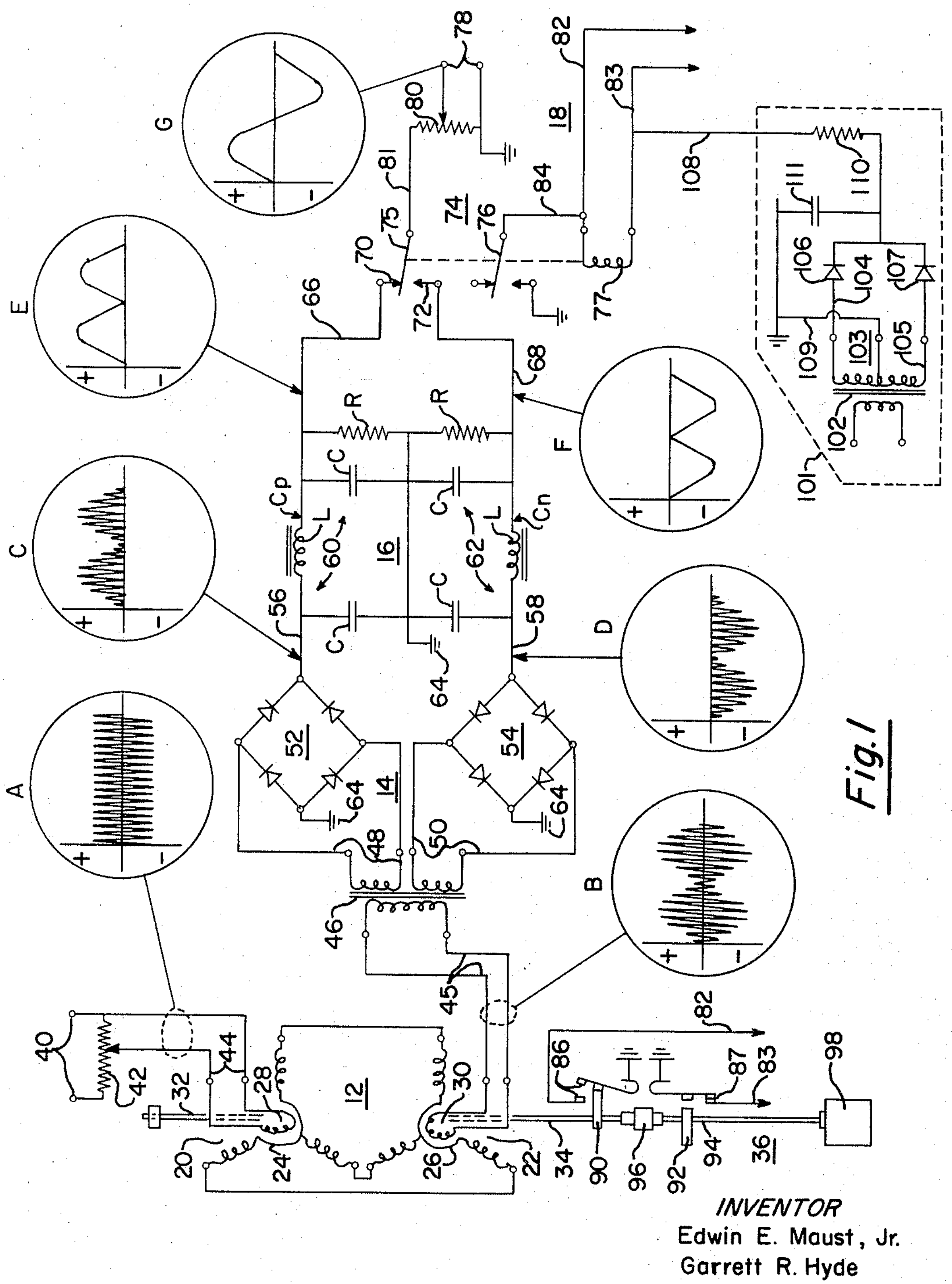
FIG. 1 is an electrical schematic overall showing of the present invention.

The preferred embodiment is represented in FIG. 1 as including a motor-driven synchronous transformer circuit 12, a discriminator circuit 14, a passive filter circuit 16, and an output synthesizer circuit 18. Transformer circuit 12 comprises two synchronous transformer components 20 and 22, individually composed of a three phase stator 24 and 26, respectively, and a rotor 28 and 30, respectively, which normally can be turned relative to the stator associated therewith. Stators 24 and 26 are interconnected in a conventional manner by separate leads joining the respective ends on corresponding windings thereof. A shaft 32 is shown in FIG. 1 as maintaining rotor 28 in operative relationship to stator 24. Rotor 30 is seen supported on a further shaft 34, extending into a switch programming mechanism 36, to be hereinafter more fully explained, which controls the operational sequence of output synthesizer circuit 18. Power input to transformer 20 is an alternating current from a source 40 by way of a potentiometer 42 across the source and leads 44 connecting this potentiometer to transformer rotor 28.

Discriminator circuit 14 receives an input from synchronous transformer circuit 12 by way of a coupling transformer 46, having its primary winding connected by leads 45 in a circuit with terminals receiving an output from rotor 30 of synchronous transformer 22. Output from transformer 46 is equally divided in two secondary windings which are shown in FIG. 1 separately connected by lead pairs 48 and 50, to two full wave bridge rectifier circuits 52 and 54, respectively. The separate rectifier circuits differ from each other only in that their corresponding diodes are connected so as to have reverse polarity relationships with respect to the junctions of the respective circuits. Rectified outputs from discriminator circuit 14 are supplied on leads 56 and 58 wherefrom they are received in connections to these leads forming two distinct channels $C_p$ and $C_n$ wherein identical impedance networks 60 and 62, comprising in a conventional arrangement suitable RLC components, are effective in circuits completed through common return connection 64 to function as the previously mentioned passive filters 16.

The filtered modulated direct current outputs from channels $C_p$ and $C_n$ are supplied on separate leads 66 and 68, respectively, and made available at contacts 70 and 72 of a relay operated switch 74 in output synthesizer circuit 18. Ganged contact arms 75 and 76 of switch 74 are actuated by a relay coil 77. Contact arm 75 is made effective by a regular sequential relay operation to alternately complete circuits through the respective channels $C_p$ and $C_n$, by way of contacts 70 and 72, and the common return connection. Output from the system is obtained on terminals 78 which read across a variable resistance 80 connected in a lead 81 joining contact arm 75 to the common return.

Controlling the energization of relay coil 77 is a circuit comprising leads 82 and 83 which join the respective ends of the coil to normally closed contact pairs 86 and 87, respectively A cam 90 fixed to shaft 34 is arranged to actuate and open contact pair 86 during each alternate half cycle of cam rotation. A similar cam 92 fixed to a further rotatable shaft 94, is arranged thereon so as to open contact pair 87 only when return to normal closure of contact pair 86 is permitted by cam 90. Shaft 94 is fixed to shaft 34 by an adjustable coupling 96, and is rotatable therewith by a regulatable drive mechanism 98. It is thus evident that cams 90 and 92 function to effectuate a 180 degrees out-of-phase actuation control of the contact pairs associated therewith. Relay coil 77 is energized by power from a supply generally designated 101, comprising a source transformer 102, and a full wave rectifier circuit 103 connected across the transformer secondary by leads 104, 105, containing diodes 106 and 107, respectively. A circuit including leads 108 and 109, establishes connections wherein relay coil 77 and a resistance 110, in series therewith, are supplied with power in accordance with the switching control exercised by cams 90 and 92. In connecting the common return to a center tap on the secondary of transformer 102, lead 109 completes circuits wherein diodes 106 and 107 are effective to allow each half of the transformer secondary to alternately supply power to the load circuit. A capacitor 111 is connected across the load circuit to smooth out the pulsating direct current thus produced.

Synchronous transformers 20 and 22 function as selsyn devices in an arrangement where rotor 28 of selsyn 20 is clamped fixed in position with respect to its stator 24, as well as stator 26 of selsyn 22. A rotational drive from motor mechanism 98 operates rotor 30 to provide at the rotor's output terminals a voltage whose magnitude at any instant is a function of the angular position of its shaft 34. When the rotor is exactly in correspondence, or exactly 180 degrees out of correspondence with the rotor-stator alignment in selsyn 20, the output voltage of selsyn 22 is zero. For all intermediate positions of rotor shaft 34, the output voltage is nonzero and varies up to a maximum value when the rotor is 90 degrees or 270 degrees out of correspondence. Nevertheless, the output voltage is at all times a modulated supply voltage, which at source 40 of the preferred embodiment is 60 cycle alternating current. The amplitude of this 60 cycle voltage wave form varies with the relative angular position of rotor 30. Thus, if rotor 30 is driven at a constant angular frequency, the output is 60 cycle A.C. whose amplitude is modulated at the frequency with which rotor 30 turns.

As is well known, rotation of a coil such as rotor 30 at a constant frequency within the symmetrical magnetic flux of stator 26, induces a voltage which will vary sinusoidally with time because the flux through the coil varies as the sine of the angle between the plane of the rotor coils and the field direction. In the instant selsyn arrangement the A.C. supply to rotor 28, together with the interconnected stators, provide the requisite magnetic field. Since this field is alternating at the supply frequency, an A.C. voltage will be induced in rotor 30 even if it is stationary. Turning the rotor merely changes the degrees of coupling between the rotor windings and the alternating field and thereby changes the magnitude of the induced voltage. The degree of coupling varies with the orientation of the rotor in the same way that the flux through the coil varies with its orientation relative to the constant field. Accordingly, the magnitude of the selsyn output varies sinusoidally if the rotor is turned at a constant angular frequency. This variation due to rotor displacement is superimposed on, that is modulates the carrier A.C. voltage. Moreover, the envelope of the selsyn output is necessarily symmetrical with respect to zero-voltage line or time axis, because the transformer action in the selsyns is exactly the same for positive-going carrier voltage as for negative-going carrier voltage.

The wave form of inset A illustrates the alternating current supplied by source 40, which is depicted by the wave form of inset B as modulated by one complete revolution of the rotor while it is continuously rotated at a constant angular frequency. It can be seen therefrom that the envelope of the 60 cycle A.C. is of the nature of two sine waves 180 degrees out of phase having the same frequency as the angular frequency of the rotor shaft. It should also be evident that since a voltage is induced in rotor 30 whether or not it is rotating, there is no lower limit to the frequency which can be generated by the instant system. Consequently, the present invention can have utility as a direct current power supply when rotor 30 is also maintained stationary with respect to its stator. It is evident that any desired magnitude of steady D.C. voltage, from zero to maximum amplitude, can be obtained by merely adjusting the setting of rotor 30 to a requisite angular position with respect to stator 26.

Since the rotational speed of the selsyn 22 rotor shaft determines a frequency at which the 60 cycle A.C. is modulated, selecting or varying the output frequency involves control of the rotor shaft speed. Shaft drive control mechanism 98 of the preferred embodiment includes two variable speed direct current motors, suitable reduction gearing, and a differential. Where, for example, the selected frequency range requires a shaft speed of 0.6 to 120 r.p.m., fractional horsepower D.C. motors are appropriate since such motors are easily varied in speed by varying the armature voltage, and their output torque is essentially independent of speed. The useful speed range of the motor noted, is normally 150 to 1700 r.p.m., or a range of about 10 to 1. High and low speed drives are obtained by separately equipping the aforesaid variable speed motors with gear trains having a reduction ratio of 10 to 1 and 200 to 1, respectively. A conventional differential which is used to couple these gear trains to the selsyn rotor shaft, allows either motor to be stopped while the other is positively geared to the rotor shaft. Thusly, a change in speed range can be accomplished merely by energizing one motor or the other. Output frequencies made possible by the gearing arrangement described extends from 0.012 to 0.14 cycle per second at low speed, and 0.25 to 2.8 cycles per second at high speed.

The modulated A.C. output from rotor 30 which is supplied to discriminator circuit 14, and separated into channels $C_p$ and $C_n$ by the dual secondary windings of transformer 46, is rectified through the oppositely disposed diodes of bridge rectifiers 52 and 54 such that channel $C_p$ voltage consists of only positive peaks of 60 cycle signal, while the channel $C_n$ voltage consists of only negative peaks. However, the low frequency modulation imposed by the selsyn action still appears in both channels wherefore the output of each channel is full-wave rectified 60 cycle A.C. modulated at the rotor frequency as depicted in insets C and D of FIG. 1. For carrier frequencies in the audio range or lower, the modulated signal will be transformed almost perfectly, and appear relatively distortion free in each of the secondary windings of transformer 46. However, these windings as well as the components of the circuits in both channels should be as nearly identical as possible in order to produce a perfect sine wave. Some crossover distortion may be introduced into the low frequency output wave form by nonideal diodes in bridge circuits 52 and 54. The small forward bias voltage which must be applied before current will flow at the diode junction, does not allow a rise from zero with the input wave form but remains at zero or slightly negative until the input voltage exceeds the small forward voltage needed. An improved waveform going through zero smoothly can be achieved by a judicious choice of diodes.

Filter circuits 16 act to attenuate, or smooth out, voltages having the carrier frequency and pass, unaltered, the modulation frequencies. Therefore, the outputs of these circuits consist of direct current voltages varying with time which as found in channels $C_p$ and $C_n$ have different polarities with respect to ground. As depicted in insets E and F of FIG. 1, the D.C. voltages of each channel has the waveform of a full-wave rectified A.C. voltage varying sinusoidally with time at the modulation frequency.

The separate channel outputs of opposite polarities are presented at relay contacts 70 and 72, wherefrom an alternating current at the modulation frequency is synthesized and supplied at terminals 78 by the relay operation in synthesizer circuit 18. As previously explained, contact pairs 86 and 87 are actuated by the cams 90 and 92 to control a circuit which determines the operation of the synthesizer relay 74. These contact pairs are arranged so that they energize or deenergize relay 77 when the output signal derived in each channel crosses the time line going through zero amplitude whereby alternate positive and negative half-cycles from the respective channels are combined so as to produce an output having the sine wave form shown in inset G of FIG. 1.

Referring again to FIG. 1, it can be seen that contact pair 86 is held open by cam 90 when normally closed contact pair 87 is unaffected by its cam 92 which is 180 degrees out-of-phase with cam 90. Consequently relay coil 77 is deenergized such that its contact arms 75 and 76 engage contact 70, and a dummy contact, respectively. It follows that a positive half wave of the modulated rectified voltage is supplied through contact 70, contact arm 75 and lead 81 to system output terminals 78. Coincident with a zero amplitude in the output voltage cam 90 has turned to release contact pair 86 for a momentary closure and cam 92 has turned to where it holds open contact pair 87. It now follows that current in a circuit completed from power supply 101 by way of leads 108, 82, contact pair 86, and the common return, or ground thereat, energizes relay coil 77. Contact arms 75 and 76 are thereby actuated such that a circuit completed through contact 72, and contact arm 75 initiates the output of a negative rectified half wave from channel $C_n$ to terminals 78, and a relay locking circuit from ground is completed to power supply 101, through contact arm 76, and leads 84, 83 and 108. This locking circuit maintains the negative output circuit in action until the waveform amplitude again reaches zero at which time cam 92 has turned to where it momentarily releases contact pair 87 for closure. A circuit completed through closed contact pair 87 and ground thereat, leads 108 and 83, shorts across power supply 101 so as to instantly deenergize relay coil 77, and return synthesized circuit 18 to the condition represented in FIG. 1.

The clamping device used to fix the relative position of rotor 28 in selsyn 20, can be adjusted to precisely set the position of the cam controlled switching of contact pairs 86 and 87 to occur at zero output voltage. This clamp permits the rotor to be turned several degrees in either direction and locked where indicated for optimum operation. In addition, adjustable shaft coupling 96 between cams 90 and 92, allows the cams to be displaced with respect to each other so that switching occurs exactly 180 degrees apart. The aforesaid rotor clamp adjustment can then be made to advance or retard the output wave relative to the switching times to obtain the desired correspondence.

Other synthesizing circuitry can be used in place of cam-driven breaker points and relay, including gate-controlled switches triggered by Schmitt triggers adjusted to trip when the output voltage passes through zero. Alternatively, both switching and rectification might be accomplished using silicon controlled rectifiers in conjunction with Schmitt triggers. In either case, switching would be controlled by the output directly and would be automatically synchronized, independent of frequency.

Potentiometer 42 across the A.C. supply 40, is provided to obtain control of the input voltage in an obvious manner. Potentiometer 80 at the output of the system permits adjustment of the output voltage, and in addition provides a more or less constant load for the internal circuitry so that the output is relatively independent of an external high impedance load.

Figure 2:
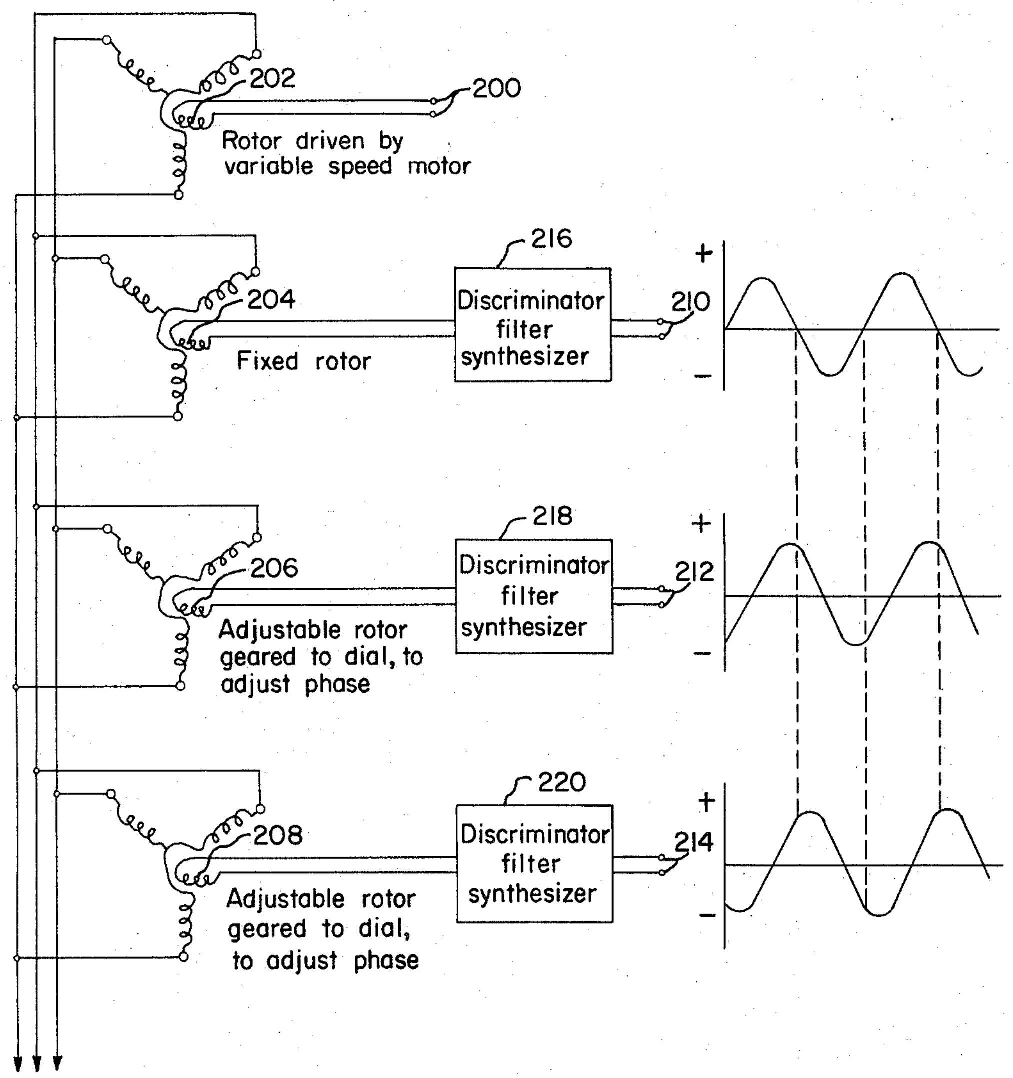
FIG. 2 is a partially schematic and diagrammatic showing of a further embodiment of the invention in this case.

Several sine waves all having exactly the same frequency, but constant and adjustable phase relationship with one another can be obtained by using additional selsyns parallel connected as shown in FIG. 2. The A.C. input is applied at terminals 200 to a driven rotor 202, and outputs are taken from each of the other rotors 204, 206, and 208. System outputs are taken at terminals 210, 212 and 214, respectively. Rotors 204, 206, and 208 are normally not rotating, but can be turned relative to one another. Each such rotor is operatively associated with its own separate discriminator, filter, and synthesizer circuits corresponding to those shown in FIG. 1, which are diagrammatically indicated in FIG. 2 by enclosures 216, 218, and 220. The relative phases of the low frequency outputs will depend only on the relative positions of the respective rotors. Each of the rotors 204, 206, and 208 can be turned or adjusted by a precision gear train and dial so that the phase relationship are selectable as desired. Because only a single rotating rotor determines the frequency of all the outputs, the frequencies of such outputs are necessarily identical. A range of output frequencies is secured by changing the speed of the single rotating rotor, as was heretofore explained. It will be evident that the arrangement of FIG. 2 has special utility in obtaining precision measurements of phase shifts.

Two or more sine waves having a fixed relationship between their frequencies can be obtained by a system comprising two or more of the basic systems described in connection with FIG. 1, wherein the rotating rotors of each are geared together. Using positive gearing, the ratio of the frequencies is set by the gear ratio which can be depended upon to remain constant. The phase relationship of the waves is subject to variability as desired by adjusting the normally stationary rotor or rotors of the basic system or systems. This arrangement can be applied to measure phase shifts using an electronic counter, by setting the gear ratio between rotors at 360 to 1. For example, an output frequency $f$ is applied to the system under test, and the output frequency $360f$ is applied to the time base of a counter which is gated to start when one of the variables, such as voltage, is zero and to stop when another variable, such as current, is zero. Accordingly, the reading of the counter will be the phase shift between the two variables directly in degrees, providing a digital readout of phase shifts.

An important advantage of the present invention is the wide range of frequencies which it can make available in addition to a direct current output. Moreover, it is easily applicable to provide any number of sine waves of identical frequencies and almost any variable phase relationship over a wide frequency range, as well as multiple outputs having fixed frequency ratios over a wide frequency range. Use is made of simple circuitry characterized by long term stability and which lends itself to rugged construction and operation in severe environments.

What is claimed is:

1. A frequency converter system comprising an arrangement of synchronous transformers, a primary voltage source of alternating current having a predetermined basic frequency, circuit means supplying said source voltage to said arrangement, rotational drive means connected to means in said arrangement operable to superimpose a modulating frequency in accordance with an angular frequency of said rotational drive on said basic frequency and supply a voltage at said modulated basic frequency at an output of said arrangement, cooperatively interrelated rectifier and filter circuitry, voltage coupling means supplying said arrangement output voltage to said circuitry wherein said voltage is distributed in accordance with positive and negative polarity by rectification in said rectifier circuitry, and depleted of said basic frequency thereof in passing through said filter circuitry, whereby said circuitry produces separated positive and negative rectified output voltages pulsating in accordance with said modulating frequency, and a voltage synthesizer means comprising system output connections and further circuit means operatively responsive to the operation of said rotational drive means, said further circuit means receiving said circuitry output voltage and producing at said system output connections an alternating voltage having said modulating frequency.

2. A frequency converter system of claim 1, wherein said cooperatively interrelated rectifier and filter circuitry comprises positive and negative voltage processing channels and said voltage coupling means supplies an identical modulated output voltage to each of said channels, rectifier and filter circuits interrelated in said positive channel to produce at an output thereof a positive rectified voltage pulsating with said modulated frequency and further rectifier and filter circuits interrelated in said negative channel to produce at an output thereof a negative rectified voltage pulsating with said modulated frequency, and said further circuit means of said voltage synthesizer means including alternately effective channel output switching means operatively responsive to means activated by said rotational drive means.

3. The frequency converter of claim 2 wherein said arrangement comprises a plurality of synchronous transformers each including a stator and rotor and wherein corresponding windings of said stators are interconnected in separate parallel circuits, one of said transformers having a rotor fixed with respect to the stator thereof receiving said source voltage, said rotational drive having a selectable angular frequency and operable through a drive transmitting means to rotate at least one of said rotors of a transformer.

4. The frequency converter of claim 3 wherein said electrical coupling means is a transformer receiving said voltage having said modulated basic frequency from said rotatable rotor of said arrangement, and supplying a multiple of said voltage from substantially identical transformer outputs to each of said channels, and each said channel rectifier comprises a full-wave rectifier means receiving said transformer output.

5. The frequency converter of claim 4, wherein said rectifier means in said positive channel changes said modulated basic frequency voltage received therein to a pulsating positive direct current having said modulated basic frequency, and said rectifier in said negative channel changes said modulated basic frequency voltage received therein to a pulsating negative direct current having said modulated basic frequency, and said filter circuits are operable in said channels, respectively, to modify said modulated basic frequency direct current voltages to said direct current voltages pulsating with modulated frequency.

6. The frequency converter of claim 2 wherein said channel output switching means comprises interruptable connections in both said channels and cyclically effective means operable in response to said control means to change said connections to complete circuits from said channels to said system output connections in synchronism with the angular frequency of said rotational drive means.

7. The frequency converter of claim 6 wherein said rotational drive means comprises a shaft means connecting said arrangement means to a variable speed driver mechanism, said switching means including a relay, said control means including a pair of cams disposed on said shaft means diametrically out of phase, and first and second sets of normally closed contacts, a relay power supply, and a circuit for energizing said relay including said power supply and said contact sets, said relay comprising first and second contact arms of which said first contact arm is normally effective to complete said system output circuit to one of said channels, and effective when relay actuated to complete said system output circuit to the other of said channels, one of said cams being cyclically effective to allow momentary engagement of said first set of contacts when the other of said cams drives opens said second set of contacts wherefore said energizing circuit is effective to actuate said relay to displace said first contact arm to complete one of said system output circuits, and said second contact arm to complete a locking circuit for said activated relay, and when said one cam is cyclically operative to drive open said first set of contacts when the other of said cams is effectively disposed to allow closure of said second set of contacts, said energizing circuit is ineffective to activate said relay and said contact arms are normalized wherefore the other of said system output circuits is completed.

8. The frequency converter of claim 7 wherein said shaft means comprises first and second parts, said one of said cams being affixed to said first shaft part, and said other of said cams being affixed to said second shaft part, and means releasably coupling said shaft parts for rotation together whereby said cams thereon are relatively displaceable with respect to each other upon release of said coupling.

9. The frequency converter of claim 2 wherein said arrangement comprises at least three synchronous transformers each including a stator and a rotor, and having corresponding windings of said stators interconnected in parallel circuits, settable means establishing a predetermined angular frequency for said rotational drive means, one of said transformers having a rotor coupled to said rotational drive means and driven thereby at a preset angular frequency, further means applying said primary source voltage to energize said driven rotor, another of said transformers having a rotor fixed with respect to the stator thereof, and a still further one of said transformers having a rotor positionally adjustable with respect to the stator thereof, means coupled to said adjustable rotor to indicate the relative position thereof, said electrical coupling means connecting said respective outputs from said fixed and adjustable rotors to separate combinations of positive and negative voltage processing channels, whereby each said combination produces alternating voltage of a predetermined frequency and having varying phase relationships with respect to one another.

References Cited

UNITED STATES PATENTS

| | | | |
|---|---|---|---|
| 2,436,807 | 3/1948 | Isbister | 318—30 |
| 3,105,179 | 9/1963 | Young et al. | 318—6 |
| 3,324,375 | 6/1967 | Pearce | 321—7 |

JOHN F. COUCH, *Primary Examiner.*

WARREN E. RAY, *Examiner.*

G. GOLDBERG, *Assistant Examiner.*